United States Patent Office

3,772,215
Patented Nov. 13, 1973

3,772,215
WATER SOLUBLE ENTRAPPING OF A FRAGRANCE
Francis E. Gould, Princeton, and Thomas H. Shepherd, Hopewell, N.J., assignors to National Patent Development Corporation, New York, N.Y.
No Drawing. Original applications June 13, 1969, Ser. No. 833,182, now Patent No. 3,576,760, and Sept. 9, 1970, Ser. No. 70,939, now Patent No. 3,681,248. Divided and this application Feb. 18, 1972, Ser. No. 227,644
Int. Cl. A61k 7/00; C11b 9/00
U.S. Cl. 252—522                 4 Claims

ABSTRACT OF THE DISCLOSURE

Fragrant materials are entrapped in water soluble hydroxyalkyl acrylate or methacrylate polymers to provide ready sources of the material by the deletion of water. Thus, there can be entrapped flavoring agents and fragrances.

---

This application is a division of application Ser. No. 833,182, filed June 13, 1969 now U.S. Pat. 3,576,760, and is also division of application 70,939, filed Sept. 9, 1970 and now U.S. Pat. 3,681,248.

The present invention relates to the preparation of ingredients entrapped in a water soluble polymer.

Linear hydroxyalkyl acrylate and methacrylate soluble in solvents other than water are disclosed in our copending application Ser. No. 654,044, filed July 5, 1967. These polymers, however, are not soluble in water as the sole solvent.

Frequently it is desirable, however, to entrap materials in a water soluble polymer. Thus, the advantages of a water soluble polymer become apparent in certain uses, e.g., in the entrapment of flavors, perfumes, etc. wherein the polymer carrying the entrapped material is added to water, as for example in a soft drink or in a detergent composition. In these cases, it is desirable to have the polymer dissolve to avoid the presence of suspended granules which can detract from the appearance in a drink or leave a dusty residue on clothing, dishes, etc. in the case of a detergent.

The water soluble polymers also are advantageous in trapping certain species such as enzymes which will not tolerate alcohol or solvents other than water.

It is an object of the present invention to prepare novel compositions containing materials entrapped in a water soluble polymer.

Another object is to protect materials from attack by atmospheric oxygen.

A further object is to devise a means for contacting non-water soluble materials with an aqueous environment.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by employing water soluble hydrophilic polymers of hydroxyalkyl acrylates and methacrylates as entrapping agents. Thus there are employed copolymers of hydroxyethyl acrylate, hydroxypropyl acrylate, hydroxyethyl methacrylate or hydroxypropyl methacrylate with 0.5 to 20% of a water solubilizing copolymerizable monomer. The copolymerizable monomer should be present in amount sufficient to be sure that the polymer is completely soluble in water. Of course, mixtures of hydroxyalkyl acrylates and methacrylates can be employed. Thus, while the hydroxyalkyl methacrylate esters are preferred as starting material up to about 40% by weight of hydroxyalkyl acrylate can be used in the hydroalkyl methacrylate containing mixture of monomers.

The polymers employed in the present invention being water soluble distinguish not only from those in our prior application but also distinguish from the cross linked hydroxyalkyl methacrylate polymers and the like shown in Wichterle Pat. 3,220,960 for example, since the Wichterle polymers is not soluble in any solvent, but only swellable. The polymers employed in the present invention are not only soluble in water but are also soluble in many polar solvents.

The polymers employed in the present invention have the advantage over conventional water soluble polymers such as polyethylene oxides, polyvinyl alcohol, cellulose ethers, etc. in the barrier properties of the dry polymer. The polymers of the present invention give superior protection to entrapped species from atmospheric oxygen and are superior in preventing diffusion and loss of the entrapped species.

The solubilizing comonomer in polymerizing the hydroxyalkyl acrylate or methacrylate can be either (1) an ammonium or alkali metal (e.g., sodium or potassium) salt of a polymerizable ethylenically unsaturated (or non-benzenoid unsaturated) organic acid or (2) a strong acid salt of a polymerizable ethylenically unsaturated (or non-benzenoid unsaturated) amino containing monomer.

Examples of organic acids for making the ammonium and alkali metal salts include acrylic acid, methacrylic acid, maleic acid, fumaric acid, itaconic acid, aconitic acid, cinnamic acid, crotonic acid, cyclohexene, carboxylic acid, propiolic acid, mesaconic acid, citraconic acid, vinyl sulfonic acid, p-vinylbenzenesulfonic acid, partial esters such as mono 2-hydroxyethyl citraconate, mono 2-hydroxypropyl itaconate, mono 2-hydroxyethyl itaconate, mono 2-hydroxypropyl citraconate, mono 2-hydroxyethyl maleate, mono 2-hydroxypropyl fumarate, mono methyl itaconate, monoethyl itaconate, mono methyl Cellosolve itaconate (methyl Cellosolve is the monomethyl ether of diethylene glycol), mono methyl Cellosolve maleate, mono-2-hydroxyethyl aconitate.

Examples of strong acid salts of polymerizable amino containing monomers are the hydrochloric, hydrobromic, sulfuric acid, nitric acid, phosphonic acid, benzene sulfonic acid, naphthalene sulfonic acid, trichloroacetic acid, and p-toluene sulfonic acid salts of diethylaminoethyl methacrylate, dimethyl aminoethyl methacrylate, monomethylaminoethyl methacrylate, t-butylaminoethyl methacrylate, p-aminostyrene, o-aminostyrene, 2-amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2-pyrrolidinoethyl methacrylate, 3-(dimethylaminoethyl)-2-hydroxypropyl acrylate, 3 - (dimethylaminoethyl)-2-hydroxypropyl methacrylate, 2-aminoethyl acrylate, 2-aminoethyl methacrylate. The alkylaminoethyl acrylates and methacrylates are preferred in group (2).

A portion (up to 40% of total monomers) of the hydroalkyl acrylate or methacrylate can be replaced by acrylamide, methacrylamide, n-isopropyl methacrylamide, n-methylacrylamide, n-methyl methacrylamide, n-12-hydroxyethyl acrylamide, n-(2-hydroxyethyl methacrylamide).

When materials which are not water soluble are desired to be entrapped this can be accomplished providing they are soluble in other solvents in which the copolymers of the present invention are soluble. Such solvents include methanol, ethanol, isopropanol, n-propanol, methyl Cellosolve (monomethyl ether of diethylene glycol), ethyl Cellosolve, monoethyl ether of diethylene glycol, dioxene-water mixtures, pyridine, dimethyl formamide, dimethyl sulfoxide, tetrahydrofurfuryl alcohol and mixtures of any of the above-mentioned solvents with each other or water.

On contact of such water insoluble entrapped materials with water, the polymer dissolves, leaving the entrapped species exposed and in contact with the aqueous environment. This can be taken advantage of in applying pesticides to the soil. For example, the entrapped pesticide can be applied in the dry form to the top of the soil or it can be embedded in the soil and will be released as a result of rain or artificial watering.

Usually 0.1 to 35% of the entrapped material is employed based on the weight of the polymer.

The water soluble polymers of the present invention are infinitely soluble in water, although at concentrations above 30% solution viscosity rises sharply.

Solubility of the polymers is pH dependent. For example, polymers containing salts of carboxylic or sulfonic acids as part of the structure will not be soluble at a pH below about 3.5 and polymers containing amine salts as part of the structure will not be soluble at a pH above about 8.5.

Thus, for release of fragrance in common alkaline detergents, e.g., soap, sodium decylbenzene sulfonate, sodium lauryl sulfate, sodium dodecylbenzene sulfonate, sodium propyl naphthalene sulfonate, sodium di(2-ethylhexyl) sulfosuccinate, sodium alkyl benzene sulfonates having 14 to 18 carbon atoms in the alkyl group or the like (i.e., anonic detergents) polymers containing carboxylate salt groups are primarily useful whereas for cationic detergents, e.g., trimethylbenzylammonium chloride, 1-lauryl-3-ethylbenzotriazolium bromide, trimethyl stearamidoethyl ammonium sulfate and lauryl trimethyl ammonium chloride. Those polymers containing amine salt groups are preferable. Either type of polymer can be used with equal facility with non ionic detergents such as p-isooctylphenol condensed with 10 ethylene oxide units, polyoxyethylene sorbitane monoleate, tertiary dodecyl polyethylene glycol thioether, tri(polyoxyethylene sorbitan monopalmitate), Spans, Tweens, etc., providing there is not present another ingredient which causes a substantial pH shift away from percent.

Any common fragrance or food flavor can be entrapped, e.g. orange oil, citral, coffee, tea, lemon oil, synthetic lemon-lime flavor, strawberry flavor, vanilla, biacetyl, anise, lilac fragrance, pine fragrance, peppermint oil, oil of orchids essence, anethole, ethyl propionate, ethyl acetate, acetaldehyde, menthol and spearmint.

In addition to fragrances and food flavors, there can be entrapped in the water soluble polymers pesticides including bactericides, fungicides, insecticides and nematocides, enzymes and drugs.

Unless otherwise indicated, all parts and percentages are by weight.

EXAMPLE 1

Into a 30-gallon reactor was charged 40 lbs. of hydroxyethyl methacrylate, 4 lbs. of methacrylic acid, 120 lbs. of methanol and 0.05 lbs. of t-butyl peroctoate. The reactor was heated to 80° C. and allowed to stir 6 hrs. to effect polymerization. To the polymer solution thus obtained was added 2.5 lbs. of sodium methoxide dissolved in 25 lbs. of methanol. The resulting solution was added slowly to a 10-fold excess of acetone to precipitate the polymer. After drying, a yield of 36 lbs. of water soluble polymer was obtained.

EXAMPLE 2

The polymer of Example 1 was dissolved in methanol to provide a 10 weight percent solution. To the solution was added orange oil at a level of 20% of the polymer content of the solution. The solution was then cast as a 20 mil film (wet) on a polyethylene sheet and dried. The resulting brittle film was ground to −60 mesh to yield a powder which exhibited only a slight odor of orange oil, but which released orange oil readily on contact with water.

EXAMPLE 3

The orange oil containing powder of Example 2 was blended with a commercial detergent (sodium dodecylbenzene sulfonate) at a level of 5% of the detergent. When the detergent was added to hot water, the orange oil odor was immediately apparent.

EXAMPLE 4

Example 2 was repeated using citral in place of orange oil. A detergent composition prepared with citral containing polymer in accordance with Example 3, immediately gave off a citrus like odor when added to hot water.

EXAMPLE 5

The citral-containing polymer of Example 4 (without detergents) was pulverized to −325 mesh in a hammer mill. The micropulverized powder was milled with a saponified coconut oil soap base at a level of 1 lb. of powder to 9 lbs. of the soap. The soap was extruded and stamped into cakes. On use of the soap cake for hand washing, the citral odor was evident on the hands. This effect persisted through the life of the soap cake.

EXAMPLE 6

Example 1 was repeated with the exception that 1180 g. of potassium hydroxide dissolved in 2 gallons of water was employed for neutralization.

EXAMPLE 7

Examples 2–5 were repeated using, however, the polymer of Example 6. Equivalent results were obtained.

EXAMPLE 8

Into a 30-gallon reactor was charged 40 lbs. of hydroxyethyl methacrylate, 1 lb. of methacrylic acid, 120 lbs. of methanol and 0.05 lb. of t-butyl peroctoate. The reactor was heated to 85° C. and allowed to stir 5 hours to effect polymerization. The polymer was isolated by precipitation from the alcohol solution with water, and allowed to dry. A yield of 37 lbs. was obtained. The polymer was re-dissolved in methanol to provide a 10 weight percent solution. To the solution was added 1 liter of 10% ammonium hydroxide, and the solution was spray-dried to provide a water soluble powder suitable for entrapment of flavors, fragrances, drugs, pesticides, etc., of the types set forth above, e.g., using 10% of additive with the copolymer.

EXAMPLE 9

Strong coffee was brewed by slurrying 15 g. of ground coffee in 75 cc. of water and heating to the boiling point. The coffee solution was filtered from the grounds, and 2 g. of the polymer of Example 8 was dissolved in the solution. The solution was then evaporated to dryness in a rotary vacuum apparatus to yield a brittle film which was finely ground. On addition of the powder to boiling water, a beverage was obtained which more nearly retained the flavor of fresh percolated coffee than the usual commercial "instant" coffee.

EXAMPLE 10

Example 2 was repeated replacing the orange oil by artificial strawberry flavor. 10 parts of the strawberry flavor containing power was blended with 10 parts of sugar, 3 parts of citric acid and 4 parts of sodium bicarbonate to produce a powder which when added to water dissolved to form a sparkling clear, carbonated strawberry flavored beverage.

EXAMPLE 11

The procedure of Example 10 was repeated replacing the strawberry flavor by (a) an equal weight of lemon-lime flavor to produce a lemon-lime beverage and (b) by an equal weight of synthetic cherry flavor to produce a cherry flavor.

EXAMPLE 12

The procedure of Example 2 was repeated replacing the orange oil by an equal weight of vanillin. The resulting vanillin flavored powder was used in the preparation of dry cake mixes.

EXAMPLE 13

The procedure of Example 2 was repeated using an equal weight of biacetyl in place of the orange oil to produce a powder providing flavor enhancement when used in dry cake mixes and in oleomargarine.

EXAMPLE 14

The polymer of Example 8 was dissolved in methanol to form a 7 weight percent solution. The solution was divided into 3 portions. To portion No. 1 was added a pine fragrance at a level of 10% of the polymer content. The portion No. 2 at the same level there was added a "new mown hay" fragrance and to portion No. 3 a lilac fragrance was added at the same level. The three solutions were then spray dried to provide powders containing the respective fragrances. These powders were suitable for incorporation into soap cakes in the manner described in Example 5 and at a level of 1 pound of entrapped fragrance powder to 10 pounds of soap powder. Soap thus treated when extruded and stamped into cakes retained the fragrance for the life of the soap.

The materials entrapped in the water soluble hydroxyalkyl, acrylate or methacrylate polymers can be either solids or liquids and numerous examples of both solids and liquids are set forth supra.

What is claimed is:
1. A powdered, dry fragrance composition consisting essentially of a solid, hydrophilic water soluble copolymer of a member of the group consisting of hydroxyethyl acrylate, hydroxyethyl methacrylate, hydroxypropyl acrylate, and hydroxypropyl methacrylate with up to 20% of a water solubilizing copolymerizable monomer selected from the group consisting of (1) alkali metal and ammonium salts of a polymerizable organic acid and (2) strong acid salts of polymerizable organic amines, said water solubilizing monomer units being present in the copolymer in sufficient amounts to render the copolymer completely soluble in water having entrapped therein a fragrance solid or liquid water-additive agent or material, said composition being adapted to release the entrapped fragrance agent upon contact with water by virtue of the dissolution of the water soluble polymer in water, said polymer composition protecting the entrapped fragrance agent or material from atmospheric oxygen and preventing diffusion and loss thereof, said composition being formed from a substantially anhydrous casting syrup or solution of the entrapped fragrance agent or material and the monomers and polymerizing the composition.

2. A composition according to claim 1 wherein said copolymerizable monomer is ethylenically unsaturated.

3. A composition according to claim 2 wherein the acrylate or methacrylate is hydroxyethyl methacrylate and said copolymerizable monomer is the salt of a polymerizable organic acid.

4. A composition according to claim 2 wherein the acrylate or methacrylate is hydroxyethyl methacrylate and said copolymerizable monomer is a salt of an organic amine.

References Cited
UNITED STATES PATENTS
3,576,760   4/1971   Gould et al. _____ 252—403

SHEP K. ROSE, Primary Examiner